(12) United States Patent
Hamada et al.

(10) Patent No.: US 9,909,537 B2
(45) Date of Patent: Mar. 6, 2018

(54) GAS INJECTOR HAVING TWO SEALING REGIONS

(71) Applicant: Robert Bosch GmbH, Stuttgart (DE)

(72) Inventors: Raed Hamada, Stuttgart (DE); Felix Jaegle, Ditzingen (DE); Joerg Schoefer, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 262 days.

(21) Appl. No.: 14/665,664

(22) Filed: Mar. 23, 2015

(65) Prior Publication Data

US 2015/0267648 A1 Sep. 24, 2015

(30) Foreign Application Priority Data

Mar. 24, 2014 (DE) ........................ 10 2014 205 444

(51) Int. Cl.
*F02M 21/02* (2006.01)

(52) U.S. Cl.
CPC .... *F02M 21/0275* (2013.01); *F02M 21/0263* (2013.01); *F02M 21/0269* (2013.01); *Y02T 10/32* (2013.01)

(58) Field of Classification Search
CPC .............. F02M 21/02; F02M 21/0206; F02M 21/0215; F02M 21/0218; F02M 21/0248; F02M 21/0257; F02M 21/026; F02M 21/0263; F02M 21/0266; F02M 21/0269; F02M 21/0272; F02M 21/0275; F02M 2200/46; Y02T 10/32
See application file for complete search history.

(56) References Cited

U.S. PATENT DOCUMENTS

| | | | | | |
|---|---|---|---|---|---|
| 4,865,001 | A | * | 9/1989 | Jensen | F02D 19/105 123/27 GE |
| 5,046,472 | A | * | 9/1991 | Linder | F02M 51/061 123/533 |
| 5,076,244 | A | * | 12/1991 | Donaldson | F02M 53/043 123/499 |
| 7,117,849 | B1 | * | 10/2006 | Reatherford | F02M 21/0206 123/467 |
| 2007/0034188 | A1 | * | 2/2007 | Duffy | F02D 41/3035 123/299 |
| 2008/0011887 | A1 | * | 1/2008 | Parish | F02M 51/0682 239/585.5 |

* cited by examiner

*Primary Examiner* — Darren W Gorman
(74) *Attorney, Agent, or Firm* — Norton Rose Fulbright US LLP; Gerard Messina

(57) ABSTRACT

A gas injector, for injecting gaseous fuel, includes a valve body having a first valve seat and a second valve seat, and a closing element, which has a first sealing region, a second sealing region, a hollow region, which is delimited by a bottom and a wall, and an outlet opening configured in the bottom, the first valve seat sealing at the first sealing region, and the second valve seat sealing at the second sealing region, and at least one through opening being provided in the wall of the closing element, so that the gaseous fuel is able to be expelled both from the inner hollow region and the outer region of the closing element.

11 Claims, 6 Drawing Sheets

GAS INJECTOR HAVING TWO SEALING REGIONS

RELATED APPLICATION INFORMATION

The present application claims priority to and the benefit of German patent application no. 10 2014 205 444.3, which was filed in Germany on Mar. 24, 2014, the disclosure of which is incorporated herein by reference.

FIELD OF THE INVENTION

The present invention relates to a gas injector intended for the injection of gaseous fuel and provided with two sealing regions.

BACKGROUND INFORMATION

Apart from liquid fuels, the use of gaseous fuels, such as natural gas or hydrogen, for operating vehicles has been increasing lately as well. However, the known injectors are only conditionally suitable for these gaseous fuels, since gaseous fuels have different energy densities and volumes than liquid fuels. To ensure that internal combustion engines operated in this manner do not consume too much fuel, it is necessary to inject the most precise gas quantities possible in each injection. One or more injection process(es) per combustion cycle must also be possible in this context. Apart from the capability of injecting a certain maximum quantity within a predefined period of time, it must also be possible to meter defined minimal gas quantities in a precise manner. Also, low system pressure should prevail during the process, so that the content of a gas tank can be utilized to the fullest extent possible. Furthermore, the injector has to seal the gas from the combustion chamber between the injection processes. FIG. 1 schematically illustrates an example of a known gas injector 1, in which an outwardly opening valve needle 3 sits on a valve seat 2 at a housing 5. FIG. 1 shows the closed state of the injector. When this injector is opened, an effective overall opening cross-section initially becomes linearly larger across the lift, as long as a released annular cross-sectional area at the valve needle constitutes the smallest cross-section. As soon as the annular gap between valve needle 3 having radius R1 and housing 5 has a smaller cross-sectional area than the cross-sectional area between valve seat 2 and housing 5 that is released by the lift, a blow-in rate is constant.

There exists a conflict in objectives between the necessary mass flow rate during an injection and the need for the lowest possible system pressure of the gas in the configuration of gas injectors. This has the result that gas injectors must have the greatest possible flow cross-sections. However, because space is usually limited, the large flow cross-sections are frequently unable to be realized by simple upscaling of the dimensions of the injectors, especially in the case of outwardly opening injectors.

SUMMARY OF THE INVENTION

In contrast, the gas injector according to the present invention for the injection of gaseous fuel for an internal combustion engine having the features of claim 1 has the advantage that a flow cross-section in the sealing seat region of the injector is able to be enlarged in such a way that a sufficiently large quantity of gas is able to be injected within a predefined time even when the system pressures are low. Furthermore, the gas injector according to the present invention has a very small configuration, so that in particular no additional space for the gas injector has to be provided at the internal combustion engine. In the present invention, this is achieved in that the gas injector has a valve body which includes two valve seats and a closing element having two sealing regions, which provide sealing at the two valve seats. The closing element moreover has a hollow region including a bottom and a wall region as well as an outlet opening configured in the bottom. At least one through opening is configured in the wall region of the closing element, so that gaseous fuel is present both in the hollow region of the closing element and at its outer circumference. Gaseous fuel is therefore able to be guided both via the outlet opening formed in the hollow region as well as at the outer circumference of the closing element and, for instance, can be injected directly into a combustion chamber.

Further developments of the present invention are also described herein.

The valve body may include an outer component and an inner component. The inner component is situated within the outer component. Moreover, the first valve seat may be provided on the outer component and the second valve seat on the inner component. The inner component is furthermore disposed in the hollow region of the closing element. This makes it possible to provide an especially compact configuration of the gas injector.

According to one further specific development of the present invention, the inner component is shiftable in the axial direction. This may especially be realized by a compression element, such as a compression spring, which pretensions the inner component. With the aid of this variant, a stepped opening of the gas injector is able to be achieved in an uncomplicated manner by first releasing the first sealing seat and then releasing the second sealing seat. The inner component may especially be pretensioned in the outward direction (in the opening direction of the closing element). Moreover, the closing element may be guided at the inner component. As an alternative, the closing element is guided at the outer component.

The inner component especially may be a cylinder. Furthermore, the outer component may be a hollow cylinder.

In addition, a maximum lift of the inner component in the axial direction, which is made possible by the compression element, may be smaller than a maximum lift of the closing element. The maximally possible lift enabled by the compression element may be smaller than one half of a maximum lift of the closing element. In this way even minimal quantities can be injected in multiple injections in an uncomplicated manner. In particular, the compression force may be adjustable by the compression element, so that the maximally possible lift of the inner component is adjustable.

The valve body may include a valve body bottom having at least one injection orifice, the closing element being guided through the intake opening.

Moreover, the closing element may be an outwardly opening closing element. It is therefore possible to provide an outwardly opening gas injector in an uncomplicated manner.

In addition, the gas injector may especially be used in internal combustion engines having direct injection. In other words, the gas injector is situated directly at a combustion chamber of an internal combustion engine.

The present invention furthermore relates to a gas-operated combustion engine, which includes a gas injector according to the present invention. The combustion engine especially may be used in a vehicle.

Exemplary embodiments of the present invention are described in detail below, with reference to the accompanying drawing. Identical or functionally equivalent parts are designated by the same reference numerals.

DETAILED DESCRIPTION

In the following text, a gas injector 1 according to a first exemplary embodiment of the present invention is described in detail with reference to FIG. 2.

Figure 1:
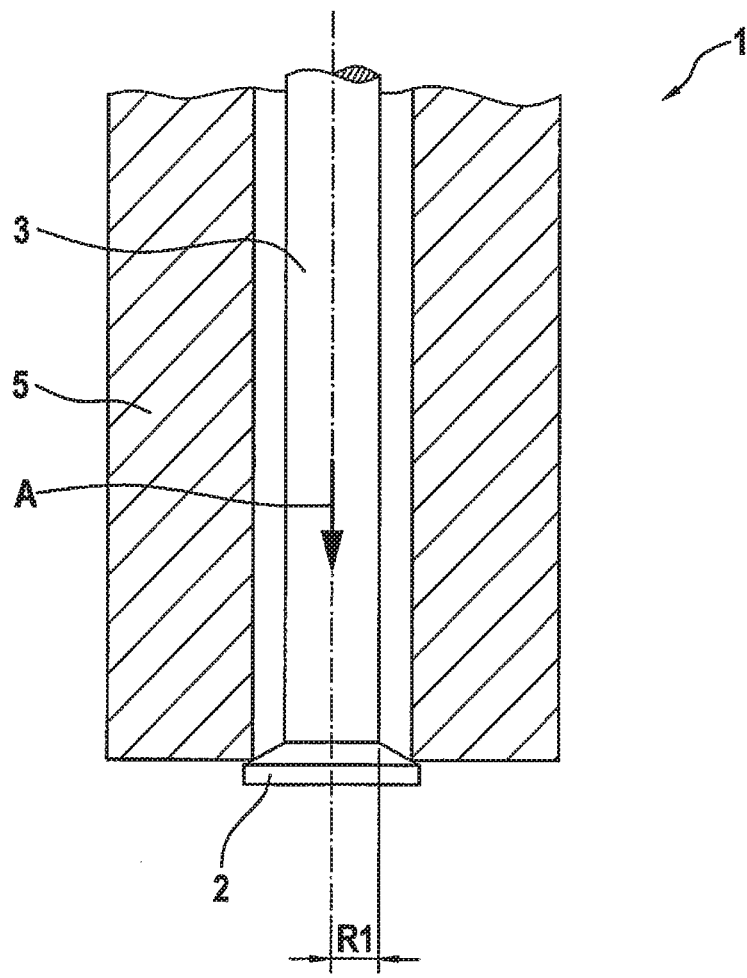
FIG. 1 shows a schematic sectional view of a gas injector according to the related art.
Figure 2:
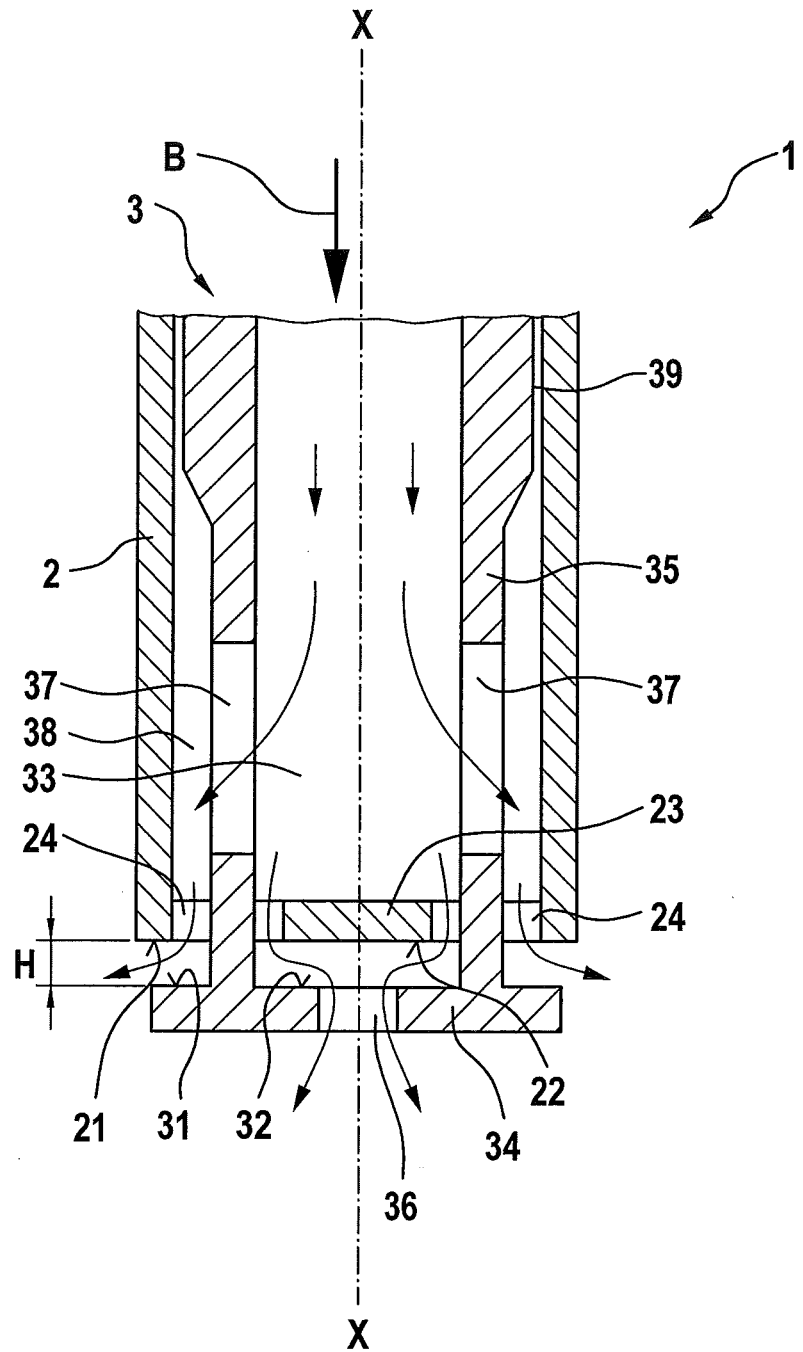
FIG. 2 shows a schematic sectional view of a gas injector according to a first exemplary embodiment of the present invention.

As can be gathered from FIG. 2, gas injector 1 includes a valve body 2 and a closing element 3. FIG. 2 illustrates that valve body 2 is essentially configured in the form of a cup and includes a first valve seat 21 and a second valve seat 22. The two valve seats 21, 22 are configured on a valve body bottom 23. In addition, a plurality of injection orifices 24 are formed in valve body bottom 23. The injection orifices may include two kidney-shaped openings, for instance.

Closing element 3 is partially disposed in valve body 2 and includes a bottom 34 and a hollow-cylindrical wall 35. In this way a hollow region 33 is configured inside closing element 3. Wall 35 has a plurality of through hole 37. Furthermore, a central outlet opening 36 is provided in bottom 34. first sealing region 31 and a second sealing region 32 are provided on bottom 34 in addition.

First sealing region 31 provides sealing together with first valve seat 21, and second sealing region 32 seals jointly with second valve seat 22. The sealing takes place on an outer side of valve bottom 23. As can furthermore be gathered from FIG. 2, a gas-filled outer region 38 is additionally provided on closing element 3, which is situated between closing element 3 and valve body 2 in the form of a ring. Together with sub-regions of wall 35 closing element 3 is routed through injection orifices 24 in valve body bottom 23 (see FIG. 2). Closing element 3 is configured in two parts for the assembly. Thus, closing element 3 is an outwardly opening closing element, so that gas injector 1 of the exemplary embodiment is an outwardly opening gas injector.

In addition, closing element 3 has a guide region 39, which is guided at an inner wall of valve body 2.

FIG. 2 shows the completely open state of gas injector 1. The arrows in FIG. 2 indicate the flow characteristic of the gas to be injected. Gas is guided through hollow closing element 3 (arrow B), and a portion of the gas can then flow via through openings 37 in wall 35 to outer region 38 at closing element 3. The other portion of the gas flows up to valve body bottom 23 and can be injected into the combustion chamber through injection orifices 24 and outlet opening 36 in closing element 3.

As a result, a gas injector 1 having a very compact configuration is able to be provided, which includes two concentric valve seats 21, 22. In contrast to the related art, gas is also able to be expelled via the center of gas injector 1, so that an injected quantity can be increased at a comparable opening period. This makes it possible to lower a pressure level of the gas to be injected in comparison with the related art, or to inject more gas per injection cycle.

Figure 3:
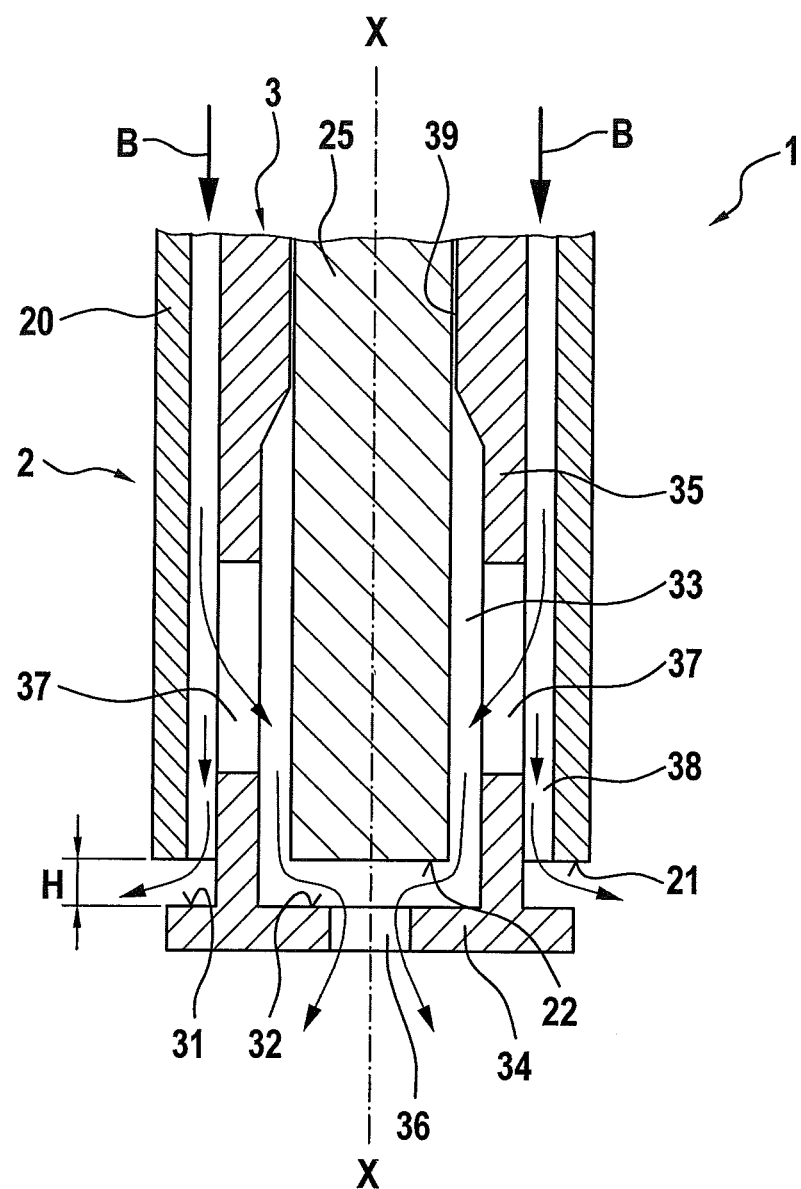
FIG. 3 shows a schematic sectional view of a gas injector according to a second exemplary embodiment of the present invention.

FIG. 3 shows a gas injector 1 according to a second exemplary embodiment of the present invention. In the second exemplary embodiment, valve body 2 consists of two parts and includes an outer component 20 and an inner component 25. Outer component 20 is configured in the form of a hollow cylinder, and inner component 25 is situated in the interior of outer component 20. Inner component 25 is a solid cylinder, and a closing element 3 is situated between outer component 20 and inner component 25, as can be gathered from FIG. 3. Closing element 3 has a similar configuration as the closing element of the first exemplary embodiment and includes a hollow region 33, a bottom 34, and a cylindrical wall 35. In contrast to the first exemplary embodiment, a guide region 39 of the closing element is formed at the inner circumference, so that a guidance takes place at inner component 25 (see FIG. 3). Another difference from the first exemplary embodiment is that the gas is supplied at the outer circumference of closing element 3 (arrow B), as indicated by the arrows in FIG. 3. Via through openings 37 provided in wall 35, the gas is then able to flow into hollow region 33.

FIG. 3 once again shows the fully open state, closing element 3 once again being opened outwardly in axial direction X-X. In the second exemplary embodiment, first valve seat 21 is configured at outer component 20, and second valve seat 22 is configured at inner component 25. After closing element 3 is opened, gas thus flows into a combustion chamber, past first as well as second valve seat 21, 22, respectively. Since valve body 2 has no bottom, in contrast to the first exemplary embodiment, the opening cross-sections in the gas injector of the second exemplary embodiment are larger than in the first exemplary embodiment. Also, in particular the production of valve body 2 from the two components 20, 25 is realizable in a simpler and more cost-effective manner.

Figure 4:
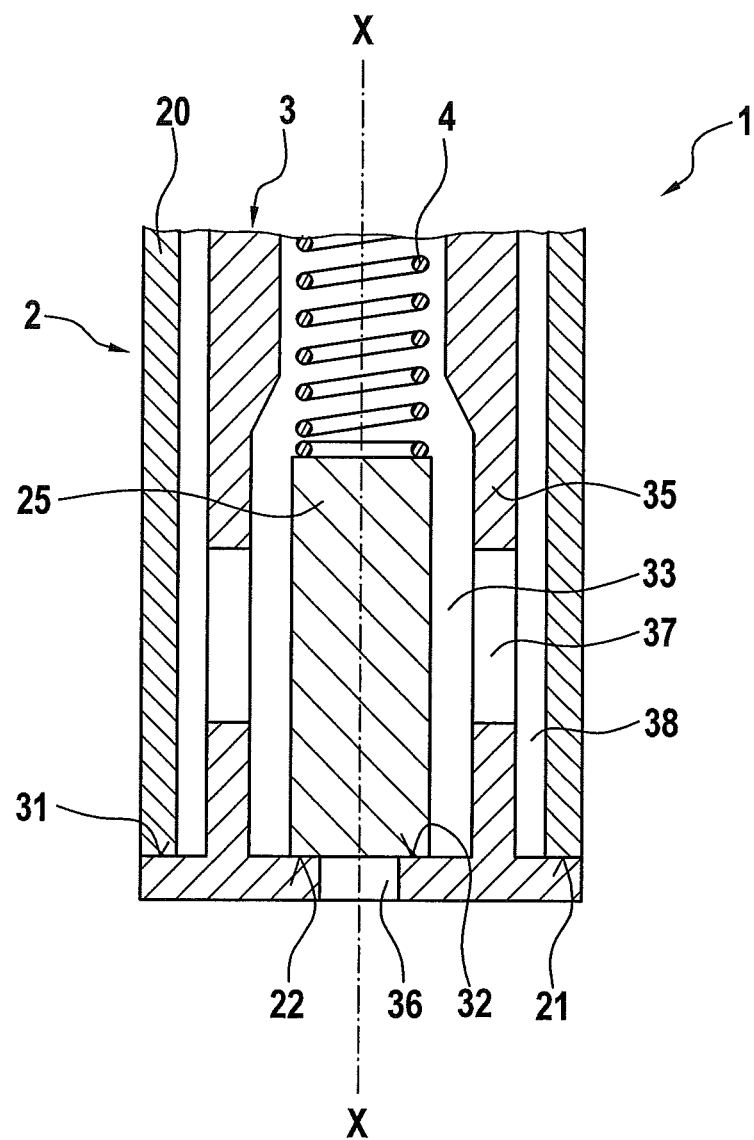
FIGS. 4, 5 and 6 show schematic sectional views of a gas injector according to a third exemplary embodiment, in different closing and opening states.
Figure 5:
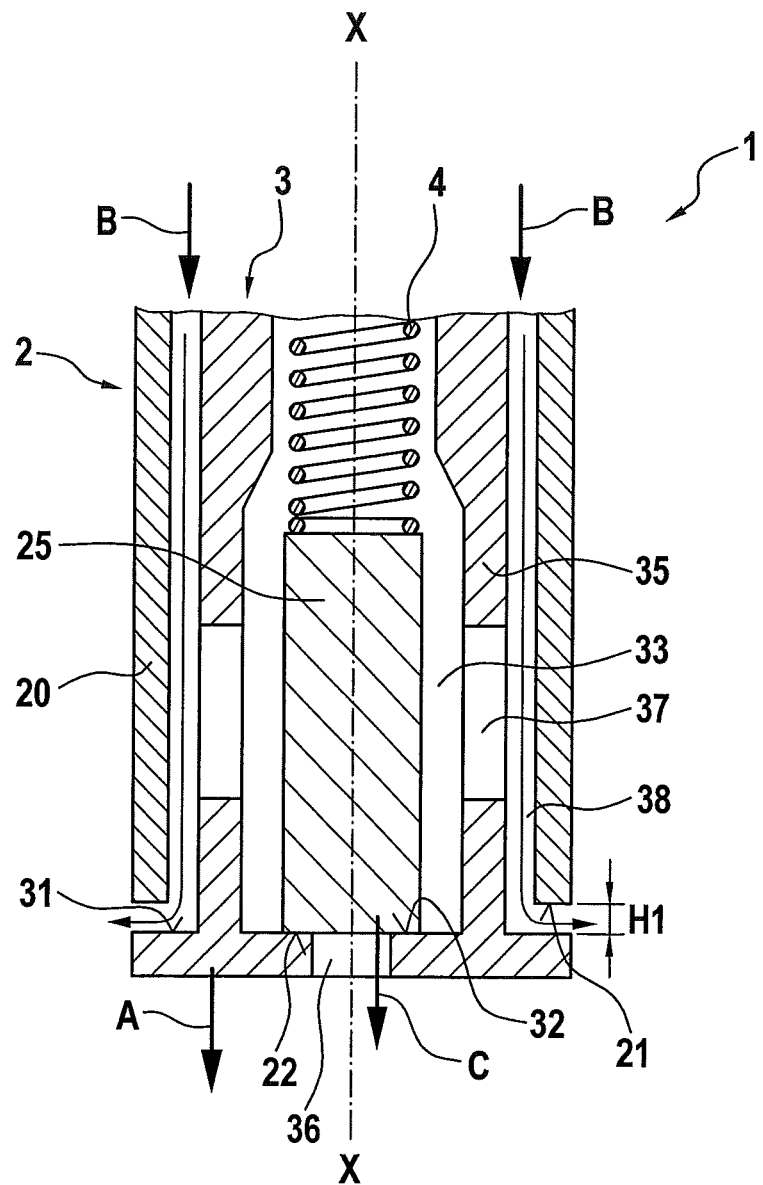
Figure 6:
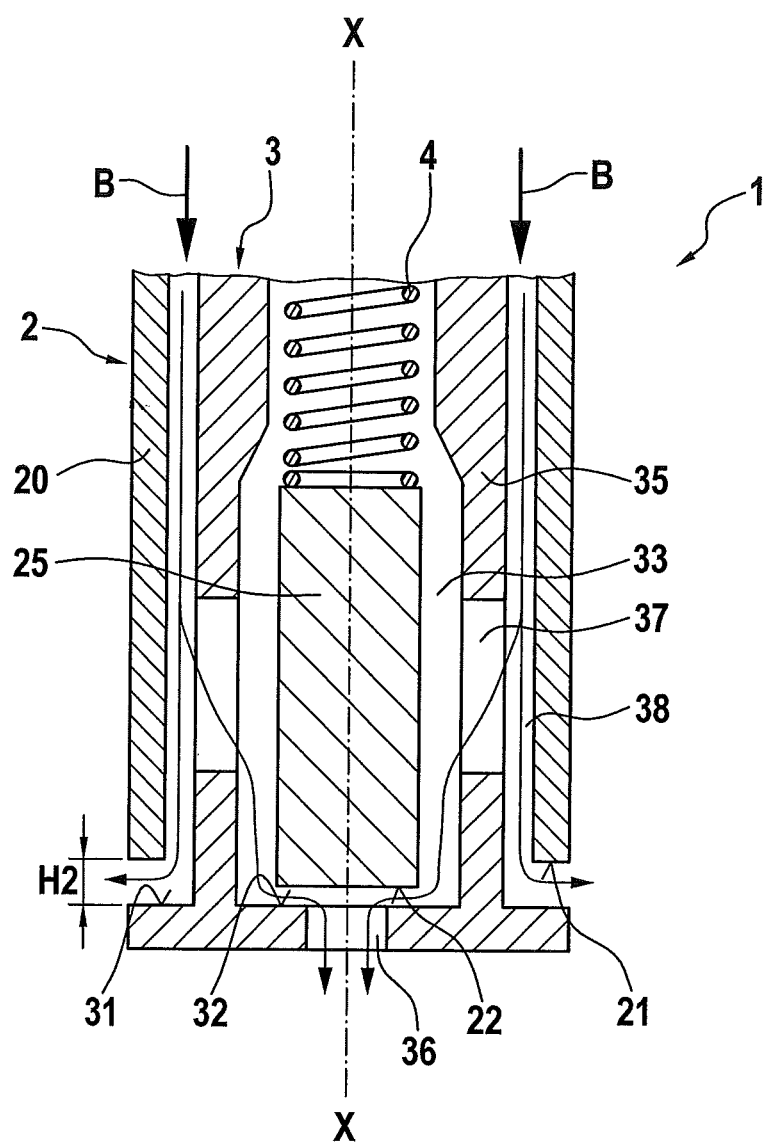

FIGS. 4 through 6 show a gas injector 1 according to a third exemplary embodiment of the present invention. FIG. 4 shows the closed state of the gas injector; FIG. 5 shows a partially open state of the gas injector; and FIG. 6 shows the completely open state of the gas injector. Gas injector 1 according to the third exemplary embodiment has a similar configuration as the second exemplary embodiment, but in contrast to the second exemplary embodiment, inner component 25 is disposed so as to allow movement in the axial direction X-X. Moreover, inner component 25 is pretensioned in axial direction X-X by a compression element 4. The gas to be injected is once again supplied at an outer periphery of closing element 3 (arrow B).

In the closed state, which is illustrated in FIG. 4, compression element 4 pretensions inner component 25 in axial direction X-X with respect to the combustion chamber. Closing element 3 seals at first and second sealing regions 31, 32 at first and second valve seat 22. It should be noted that a pretensioning force of compression element 4 is selected in such a way that it is not greater in the closed state than a closing force of a restoring element (not shown) of the gas injector that resets closing element 3 to the closed position and retains it in the closed position.

If an injection is desired, an actuator (not shown) is activated, so that closing element 3 is moved in the direction of arrow A (FIG. 5). Because of compression element 4, axially movable inner component 25 is moved in the direction of arrow C, so that second valve seat 22 remains closed, whereas first valve seat 21 is opened. This state is shown in FIG. 5.

If the lift of closing element 3 continues to become larger, a further axial movement of inner component 25 is prevented, so that second valve seat 22 is released, as well. This state is shown in FIG. 6. The gas to be injected may then be injected into the combustion chamber both at the outer circumference of closing element 3 and through outlet opening 36. A lift H1, up to which compression element 4 retains inner component 25 at second sealing region 32 of closing element 3, has been plotted in FIGS. 5 and 6, and complete maximum lift H2 is shown in FIG. 2 for comparison purposes.

According to the present invention, it is therefore provided in the exemplary embodiments to provide a gas injector 1 which has an outwardly opening closing element 3. Because of the geometric development of gas injector 1, it is provided to also inject greater gas quantities into a combustion chamber during an injection cycle. Gas injector 1 may be disposed directly at the combustion chamber. With regard to the described exemplary embodiments it should be noted that closing element 3 is able to be actuated by a magnet actuator or a piezo actuator, for example. Resetting of closing element 3 is realizable with the aid of a restoring element, such as a spring.

Another great advantage in all gas injectors according to the present invention is that flat sealing regions are configured between valve body 2 and closing element 3 in all cases. This in particular makes it possible to use seals having a simple configuration for sealing the gaseous fuel.

What is claimed is:

1. A gas injector for injecting gaseous fuel, comprising:
   a valve body having a first valve seat and a second valve seat; and
   a closing element, which includes a first sealing region, a second sealing region, an inner hollow region delimited by a bottom and a wall, and an outlet opening in the bottom;
   wherein a first valve seat sealing is at the first sealing region and a second valve seat sealing is at the second sealing region,
   wherein there is at least one through hole in the wall of the closing element, so that the gaseous fuel is able to be expelled both from the inner hollow region and at an outer region of the closing element, and
   wherein the closing element is an outwardly opening closing element.

2. The injector of claim 1, wherein the valve body includes a two-part valve body, and wherein the two-part body includes an outer component and an inner component.

3. A gas injector for injecting gaseous fuel, comprising:
   a valve body having a first valve seat and a second valve seat; and
   a closing element, which includes a first sealing region, a second sealing region, an inner hollow region delimited by a bottom and a wall, and an outlet opening in the bottom;
   wherein a first valve seat sealing is at the first sealing region and a second valve seat sealing is at the second sealing region,
   wherein there is at least one through hole in the wall of the closing element, so that the gaseous fuel is able to be expelled both from the inner hollow region and at an outer region of the closing element,
   wherein the valve body includes a two-part valve body, and wherein the two-part body includes an outer component and an inner component, and
   wherein the first valve seat is provided on the outer component and the second valve seat on the inner component, and wherein the inner component is situated in the inner hollow region of the closing element.

4. A gas injector for injecting gaseous fuel, comprising:
   a valve body defining a longitudinal axis and having a first valve seat and a second valve seat; and
   a closing element, which includes a first sealing region, a second sealing region, an inner hollow region delimited by a bottom and a wall, and an outlet opening in the bottom;
   wherein a first valve seat sealing is at the first sealing region and a second valve seat sealing is at the second sealing region,
   wherein there is at least one through hole in the wall of the closing element, so that the gaseous fuel is able to be expelled both from the inner hollow region and at an outer region of the closing element,
   wherein the valve body includes a two-part valve body, and wherein the two-part body includes an outer component and an inner component, and
   wherein the inner component is displaceable in a direction of the longitudinal axis.

5. The injector of claim 4, further comprising:
   a compression element, which pretensions the inner component.

6. The injector of claim 5, wherein the inner component is pretensioned in an opening direction.

7. The injector of claim 2, wherein the closing element is guided at the inner component or at the outer component.

8. The injector of claim 2, wherein the inner component is a cylinder and/or the outer component is a hollow cylinder.

9. The injector of claim 5, wherein a maximum lift of the inner component enabled by the compression element is smaller than a maximum lift of the closing element.

10. An internal combustion engine, comprising:
    an injector for injecting gaseous fuel, including:
        a valve body having a first valve seat and a second valve seat; and
        a closing element, which includes a first sealing region, a second sealing region, an inner hollow region delimited by a bottom and a wall, and an outlet opening in the bottom;
        wherein a first valve seat sealing is at the first sealing region and a second valve seat sealing is at the second sealing region,
        wherein there is at least one through hole in the wall of the closing element, so that the gaseous fuel is able to be expelled both from the inner hollow region and at an outer region of the closing element,
        wherein the injector is situated directly at a combustion chamber of the internal combustion engine for a direct injection, and
        wherein the closing element is an outwardly opening closing element.

11. The injector of claim 1, wherein the closing element is guided at the valve body.

* * * * *